May 6, 1958     J. V. DI FRANCO     2,833,147
FLUID QUANTITY MEASURING SYSTEM
Filed March 28, 1955
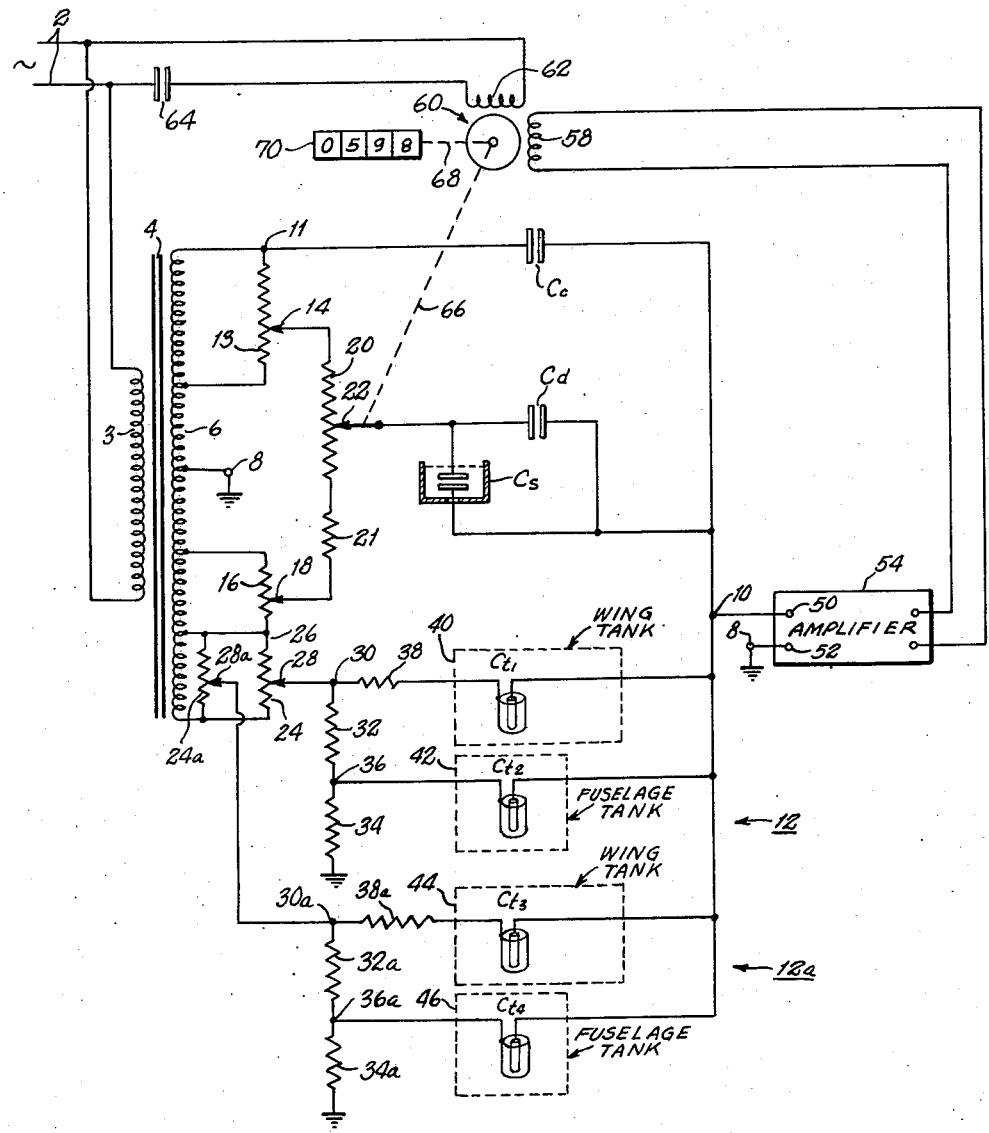
INVENTOR
JULIUS V. DI FRANCO
BY R. J. Dearborn
ATTORNEY

United States Patent Office 2,833,147
Patented May 6, 1958

2,833,147
FLUID QUANTITY MEASURING SYSTEM

Julius V. Di Franco, Flushing, N. Y., assignor to The Liquidometer Corporation, Long Island City, N. Y., a corporation of Delaware Application March 28, 1955, Serial No. 497,345

13 Claims. (Cl. 73—304)

The present invention relates to the measurement of the amount of dielectric liquid in a plurality of containers and particularly relates to capacitance type liquid measuring systems having an indicator that denotes the total weight of the liquid in a plurality of containers. This invention is in the nature of an improvement on the capacitance type measuring system described in copending application of Carl G. Sontheimer and John R. Yoder, Serial No. 177,574, filed August 4, 1950.

As explained in the above-identified application, such capacitance type measuring systems use measuring condensers having spaced electrodes arranged to be positioned in a container of dielectric liquid so that the liquid enters the space between the electrodes to an extent depending upon its level in the container. The capacitance of the condenser depends upon (a) the height of the liquid and (b) the dielectric constant of the liquid between its plates. For example, consider a gasoline measuring system; gasoline has a dielectric constant of approximately 2 relative to that of air, so that if the entire height of the space between the electrodes of the measuring condenser is replaced by gasoline, the capacitance of the condenser will be increased to approximately twice its original value. As the gasoline is consumed, its height between the electrodes drops, and air enters the top of the space between the electrodes, causing the capacitance of the condenser gradually to decrease.

These types of capacitance measuring systems are particularly well suited for the measurement of fuel in aircraft for they involve no movable floats on the surface of the fuel in the gasoline tanks.

In aircraft today, particularly in jet aircraft, it is customary to have one or more wing tanks and also to have tanks in the fuselage. Generally, the tanks in the various parts of the craft are of widely different configuration, and the wing tanks have a much greater horizontal cross-sectional area than do the tanks in the fuselage. Considerable difficulty has been experienced in accurately and simply measuring the total amount of fuel in all of the tanks of such aircraft by the use of capacitance measuring condensers because a variation of one inch in height of the fuel in the wing tanks represents a far greater change in the amount of fuel than does a corresponding change of one inch in the fuselage tanks because of the greater horizontal extent of the tanks in the wings. Various arrangements have been used for measuring the amount of liquid in the different tanks, but these systems have depended upon individually measuring fuel in each of the separate tanks and indicating this fuel on separate gauges or in combining the readings of the individual systems. This has the serious disadvantage of requiring a substantially complete measuring system for each individual tank, thus increasing the weight, complexity and expense of the measuring system as a whole.

Among the advantages of the present system when installed in an aircraft is the fact that the total fuel in all the tanks is indicated by means of a single measuring circuit which acts to totalize the amount of fuel. This system operates regardless of which of the tanks may be more nearly full and which may be more nearly empty, always indicating the total amount of the fuel.

Another advantage of the present system is that it enables a single electrical system and a single gauge to be used for reading the total fuel available.

The many advantages, aspects and features of the present invention will be more fully understood from a consideration of the following description in conjunction with the accompanying sheet of drawings in which the single figure is a schematic diagram of an electrical network embodying the present invention for indicating the total fuel quantity in a pair of wing tanks and a pair of fuselage tanks.

In the network shown, alternating current of suitable frequency, for example, such as 400 or 1000 cycles, is supplied from a source 2 to the primary winding 3 of a transformer 4 having a secondary winding 6, the mid-point of which is connected to a first measuring point 8, and is connected to the common return (or "ground") circuit. One end of the secondary winding 6 is coupled to a voltage source point 11 and through an empty tank balancing condenser $C_c$ to a second measuring point 10. The opposite end of this winding 6 is coupled to the same measuring point 10 through first and second network branches 12 and 12a including a plurality of capacitor type measuring condensers $C_{t1}$, $C_{t2}$, $C_{t3}$, and $C_{t4}$. A potentiometer 13, having a movable contact 14, is connected across a part of the top half of the secondary winding 6. A second potentiometer 16, having a movable contact 18, is connected across the middle portion of the lower half of the secondary winding 6. A potentiometer 20 in series with a fixed resistor 21 is connected between the movable contacts 14 and 18 and has a sliding contact 22 connected to the second measuring point 10 through a pair of parallel connected condensers $C_d$ and $C_s$, $C_d$ being a fixed measuring reference condenser and $C_s$ being a dielectric constant compensation condenser, having spaced electrodes and arranged to be positioned so that the liquid exists between its spaced electrodes at all times, the capacitance value of the condenser $C_s$ thus varying solely with the dielectric constant of the liquid.

A fourth potentiometer 24 is connected between the lower terminal 26 of the potentiometer 16 and the lower end of the secondary 6. This potentiometer 24 has a removable contact 28 connected to a voltage source point 30, which is in turn connected to the first measuring point (ground) through voltage-dividing means comprising a first resistor 32 in series with a second resistor 34, the resistors 32 and 34 having a connection point 36 therebetween. The movable contact 28 is also connected to the second measuring terminal 10 through a phase-compensating resistor 38 in series with the first capacitance type measuring condenser $C_{t1}$, shown as being positioned in a first wing tank 40. The connection 36 is connected to the measuring terminal 10 through the second similar measuring condenser $C_{t2}$, shown as being positioned within a first fuselage tank 42.

In order to include and totalize the fuel in other wing and fuselage tanks in the aircraft, a potentiometer 24a is connected parallel with potentiometer 24 and has its movable contact 28a in a second network branch 12a similar to the first network branch 12 and wherein elements performing functions corresponding to those in the first network branch have the same reference numerals followed by the suffix "a." The condenser $C_{t3}$ is positioned in a second wing tank 44, and the condenser $C_{t4}$ is positioned in a second fuselage tank 46.

Similarly, the fuel in other tanks may be totalized by adding further networks in parallel with the networks 12 and 12a by connecting other potentiometers in parallel with the potentiometers 24 and 24a, as will be understood from this description.

The voltage between the top end of the transformer secondary and the first measuring point 8 can be designated as "e" and the voltage between the point 8 and the lower end of the transformer, which may be generally of the same order of magnitude but opposite in phase, can be designated "−e." The impedances of the transformer windings and of all of the potentiometers and resistors are designed to be small relative to the impedances of the various condensers at the frequency of operation. Thus, the voltage applied between the movable contact 22 and the measuring point 10 is, for all practical purposes, in phase with the voltage applied from the source point 11 through the condenser $C_c$ to the measuring point 10, because the impedance of the potentiometers 13 and 20 are negligible relative to that of the condensers $C_c$, $C_d$, and $C_s$.

Likewise, the voltages of the same frequency but of opposite phase applied from the points 30, 36, 30a, and 36a through the measuring condensers $C_{t1}$, $C_{t2}$, $C_{t3}$, $C_{t4}$, respectively, to the measuring point 10 are substantially in phase with each other, for the reason that the impedances of the potentiometers 24, 24a, and of the voltage-dividing resistors 32, 34, and 32a, 34a are insignificant relative to those of the four measuring condensers.

In effect, the point 11 and the contact 22 may be considered as two sources of alternating voltage [with respect to the base potential for the network (ground) at point 8] of the same frequency and phase but of different magnitude. Similarly, the points 30, 36, 30a, and 36a may be considered as four sources of alternating voltage [with respect to the base potential (ground) for the network at point 8] of the same frequency but of phase opposite to that from the point 11 and contact 22.

As explained above, the measuring condensers $C_{t1}$, $C_{t2}$, $C_{t3}$, and $C_{t4}$ are positioned in the tanks 40, 42, 44, and 46 so that their respective capacitances are functions of the heights of the fuel in these respective tanks. In general, the capacitance $C_t$ of each of these condensers is expressed by a formula:

$$C_t = C_o[1+(K-1)x] \qquad (1)$$

where "K" is the dielectric constant of the fuel, "$C_o$" is the capacitance of the measuring condenser when the respective tank is empty, and "x" is a number between zero and unity denoting the proportionate part of the tank that is filled with fuel.

In the present system each of the measuring condensers is so shaped with respect to its respective associated tank that the change in capacitance per gallon of fuel withdrawn from the tank is the same, regardless of the amount of fuel in the tank. Thus, the condenser $C_{t1}$ in the wing tank 40 is arranged to show a constant increment of change in capacitance $\Delta C_{t1}$ for every gallon of fuel withdrawn from the tank 40. Likewise, the condenser $C_{t2}$ in the fuselage tank 42 is arranged to have a constant increment of change $\Delta C_{t2}$ for every gallon change in the fuel in the fuselage tank 42, and similarly condensers $C_{t3}$ and $C_{t4}$ have constant increments of capacitance change $\Delta C_{t3}$ and $\Delta C_{t4}$, per gallon change in fuel in their respective tanks.

In general, with the present system the only requirement is that the incremental capacitance changes for each condenser be a constant per gallon change, but there is no requirement that these constants be the same.

For purposes of simplifying the explanation of the operation, however, it is assumed that the two wing tanks 40 and 44 are of the same size and shape, and have identical measuring condensers therein, and likewise that the two fuselage tanks 42 and 46 are identical and have identical measuring condensers therein. Thus, the following formulas apply:

$$\Delta C_{t1} = \Delta C_{t3} = A \text{ mmf. per gallon} \qquad (2)$$
$$\Delta C_{t2} = \Delta C_{t4} = B \text{ mmf. per gallon} \qquad (3)$$

where "A" and "B" are the constant increments of capacitance change per gallon of fuel change in the wing and fuselage tanks, respectively.

For example, I have found a value such as about 0.8 micromicrofarad per gallon to be satisfactory. Generally, "B" is considerably larger than "A" because the fuselage tanks have a much smaller horizontal cross-sectional area than the wing tanks.

In order to totalize the fuel in all of these tanks the relative values of the resistors 32 and 34, and 32a and 34a are fixed in accordance with "A" and "B" above so as effectively to make the voltages fed to the measuring condensers in the wing and fuselage tanks inversely proportional to "A" and "B."

$$\frac{R_{32}+R_{34}}{R_{34}} = \frac{B}{A} \qquad (4)$$

$$\frac{R_{32a}+R_{34a}}{R_{34a}} = \frac{B}{A} \qquad (5)$$

The empty tank balancing condenser $C_c$ is a fixed condenser and has a value such as to balance the network when all of the tanks are empty. That is, $C_c$ is equal to the effective sum of the air-filled capacitances of the measuring condensers. That is, if $C_{o1}$, $C_{o2}$, $C_{o3}$, and $C_{o4}$ are the respective air-filled capacitances of the measuring condensers $C_{t1}$, $C_{t2}$, $C_{t3}$, and $C_{t4}$, respectively, then the empty tank balancing condenser $C_c$ has a value:

$$C_c = C_{o1} + C_{o3} + \frac{R_{34}C_{o2}}{R_{32}+R_{34}} + \frac{R_{34a}C_{o4}}{R_{32a}+R_{34a}} \qquad (6)$$

which can be simplified to:

$$C_c = 2C_{o1} + \frac{2AC_{o2}}{B} \qquad (7)$$

The relative values of the condensers $C_d$ and $C_s$ are determined in accordance with the procedure set forth in the above-identified Sontheimer application, and depend upon the empirical relationship between the dielectric constant and density of the particular dielectric liquid being used, as is thoroughly explained in that application. Generally speaking, the condenser $C_d$ is arranged to have a value of about four-fifths $C_c$ and $C_s$, when free of the liquid is arranged to have a value of about one-fourth $C_c$. With these values, the circuit will read the total weight of fuel in the tanks with reasonable accuracy, which is preferable to an indication of volume, because the volume of a given weight of fuel varies with temperature, while the weight is a measure of the energy available in the fuel.

In order to rebalance the network automatically and to indicate the total fuel, the input terminals 50 and 52 of an amplifier 54 are connected to the output terminals 10 and 8, respectively, and the output circuit of this amplifier is connected through a pair of leads to one field winding 58 of a reversible two-phase motor 60. The other field winding 62 of the motor 60 is connected to the A. C. source 2 through a phase shifting condenser 64.

The motor 60 is connected, by suitable reduction gearing or other mechanical drive means indicated diagrammatically by the broken line 66 to the movable potentiometer contact 22, and is arranged to rotate in such direction as to reduce the voltage appearing between the output terminals 8 and 10 substantially to zero. The motor is also connected through a suitable mechanical drive linkage 68 to drive a counter type indicator 70 that indicates the total fuel in the tanks 40, 42, 44 and 46.

The contact 18 is used to provide zero or "empty" adjustment for the circuit. That is, when the fuel is drained from all of the tanks, the contact 18 is slid along the potentiometer 16 until the indicator 70 reads zero. Similarly, the contact 14 is the "full" adjustment. It is used to set the indicator 70 to indicate the total weight of fuel when all of the tanks are full.

The adjustable contacts 28 and 28a are used in order to compensate for any slight actual differences between the various corresponding condenser or tank dimensions, to adjust the system to read correctly the total weight of fuel in all tanks.

The system of the present invention may have the following actual values for the various circuit elements, these values being intended as illustrative of an operative embodiment of the invention and not as limiting:

Current supply to transformer primary 3 —115 volts, 400 cycles

Voltages at various points on secondary (with respect to ground, the symbol "+" indicating one phase at points above the ground connection 8 and the symbol "—" indicating the opposite phase):

| | Volts |
|---|---|
| At point 11 | +30 |
| At lower end of potentiometer 13 | +25 |
| At upper end of potentiometer 16 | —0.35 |
| At point 26 | —5 |
| At lower end potentiometer 24 | —50 |

Resistances:

| | Ohms |
|---|---|
| Potentiometer 13 | 250 |
| Potentiometer 20 | 2200 |
| Resistor 21 | 80 |
| Potentiometer 16 | 5000 |
| Potentiometer 24 | 3000 |
| Potentiometer 24a | 3000 |
| Resistors 38 and 38a (each) | 510 |
| Resistors 32, 34, 32a, 34a (each) | 500 |

Capacitances (on basis that dielectric between plates has a dielectric constant of unity):

| | Mmf. |
|---|---|
| Condenser $C_c$ | 81 |
| Condenser $C_d$ | 62.7 |
| Condenser $C_s$ | 25.0 |
| Condenser $C_{t1}$ | 20.2 |
| Condenser $C_{t2}$ | 40.5 |
| Condenser $C_{t3}$ | 20.2 |
| Condenser $C_{t4}$ | 40.5 |

From the foregoing description it will be understood that I have provided a simple and effective system whereby a plurality of capacitor type measuring condensers can be used to determine the weight of fuel in a plurality of individual dissimilar containers. The circuit arrangement shown is well suited to provide the advantages described above, but this embodiment of the invention is not intended to be exhaustive of all of the possible arrangements for applying the various aspects of the present invention, for various changes and modifications may be made in adapting the system described to various particular applications, and the scope of the present invention is intended to include such changes and modifications.

What is claimed is:

1. Apparatus for measuring the total quantity of a dielectric fluid in a plurality of individual unlike containers, comprising a capacitor type measuring means arranged to be positioned in each of said containers, each of said measuring means having spaced electrodes arranged so that fluid enters the space between said electrodes to an extent depending upon the amount of fluid in the container in which it is located respectively, the capacitance value of each of said measuring means being dependent upon the amount of fluid in the respective container and also upon the dielectric constant thereof, each of said measuring means having respectively constant incremental capacitance change per unit change in the quantity of the fluid in the container in which it is located respectively; a reference condenser; a dielectric constant compensation condenser having spaced electrodes and arranged to be positioned so that a sample of the fluid exists between its spaced electrodes at all times, the capacitance value of said compensation condenser being dependent upon the dielectric constant of the fluid; a plurality of sources of alternating voltage all of the same frequency and all of the same first phase, means connecting each of said capacitor type measuring means to one of said sources to produce a plurality of signals of a first phase, the relative magnitudes of the alternating voltages from each of said sources being inversely proportional to the relative magnitudes of said incremental capacitance changes of the measuring means respectively connected thereto; another source of alternating voltage of the same frequency and of a second phase, means connecting said reference condenser and said dielectric constant compensation condenser to said other source of voltage in a manner to produce signals of a second phase; signal responsive means, means connecting said signal responsive means to said plurality of measuring means and said compensation and reference condensers to apply to said signal responsive means a signal which is a resultant of said plurality of signals of said first phase and said signals of said second phase, and means actuated by said signal responsive means to vary the signals of one of said phases in a direction tending to reduce the resultant signal substantially to zero.

2. Apparatus for measuring the total quantity of a dielectric fluid in a plurality of individual unlike containers, comprising a plurality of capacitor type measuring means arranged to be positioned in each of said containers respectively, each of said measuring means having spaced electrodes arranged so that fluid enters the space between said electrodes to an extent depending upon the amount of fluid in the respective associated containers, the capacitance value of each of said measuring means being dependent upon the amount of fluid in the respective container and the dielectric constant thereof, each of said measuring means having a constant value of incremental capacitance change per unit change in the quantity of the fluid in the container in which it is located; a reference condenser; a dielectric constant compensation condenser having spaced electrodes and arranged to be positioned so that the fluid exists between its spaced electrodes at all times, the capacitance value of said dielectric constant compensation condenser being dependent upon the dielectric constant of the fluid; a first source of alternating voltage of first phase, voltage-dividing means connected across said source of alternating voltage; means connecting each of said capacitor type measuring means to said voltage-dividing means in a manner to feed various fractions of the alternating voltage from said first source to each of said measuring means respectively to produce a plurality of signals of a first phase, said voltage fractions being inversely proportional to the relative magnitudes of said incremental capacitance changes of said measuring means; a second source of voltage of the same frequency but of a second phase; means connecting said reference condenser and said compensation condenser to said second source of voltage in a manner to produce signals of a second phase; signal responsive means; means connecting said signal responsive means to all of said measuring means and to said compensation and reference condensers to apply to said signal responsive means a signal which is a resultant of said plurality of signals of said first phase and said signals of said second phase; and means actuated by said signal responsive means to vary the signals of one of said phases in a direction tending to reduce the resultant signal substantially to zero.

3. A system for totalizing the amount of a dielectric fluid in a plurality of unlike containers, comprising first, second and third sources of alternating voltage of the same frequency, said first and second sources being of the same phase and said third source being of opposite phase, first and second measuring points, means connecting said first measuring point to each of said sources, a first network branch extending between said first source and said second measuring point and including an empty tank balancing condenser, a second network branch extending between said second source and said second measuring point and including a reference condenser and a dielectric constant compensation condenser having spaced electrodes and arranged to be positioned so that the fluid exists between its spaced electrodes at all times, the capacitance value of said dielectric constant compensation condenser being dependent upon the dielectric constant of the fluid, voltage-dividing means connected across said third source, a plurality of connection points along said voltage-dividing means, a plurality of capacitance type measuring condensers, each having spaced electrodes and being arranged to be positioned in each of said containers of dielectric fluid respectively, so that fluid enters the space between said electrodes of said measuring condensers to an extent depending upon the amount of fluid in the respective containers, the capacitance value of each of said measuring condensers being dependent upon the amount of fluid in the respective containers and the dielectric constant of the fluid and each having a constant value of incremental capacitance change per unit change in the quantity of the fluid in the container in which it is positioned, and circuit means respectively connecting each one of said measuring condensers between one of the connection points on said voltage-dividing means and said second measuring point to apply to said each measuring condenser a magnitude of voltage inversely proportional to said value of incremental capacitance change thereof; signal responsive means coupled to said first and second measuring points, and means actuated by said signal responsive means to vary the alternating voltage from said second source in a direction tending to reduce the voltage between said measuring points substantially to zero.

4. A system for totalizing the weight of a dielectric fluid in a pair of unlike containers, comprising first, second and third sources of alternating voltage of the same frequency, said first and second sources being of the same phase and said third source being of opposite phase, first and second measuring points, means connecting said first measuring point to each of said sources, a first network branch extending between said first source and said second measuring point and including an empty tank balancing condenser, a second network branch extending between said second source and said second measuring point and including a reference condenser and a dielectric constant compensation condenser having spaced electrodes and arranged to be positioned so that the fluid exists between its spaced electrodes at all times, the capacitance value of said compensation capacitor being dependent upon the dielectric constant of the fluid, resistance means connected across said third source, first and second connection points on said resistance means, first and second capacitance type measuring condensers having spaced electrodes and each being arranged to be positioned in one of said containers of dielectric fluid respectively, so that fluid enters the space between said electrodes to an extent depending upon the amount of fluid in the respective containers, the capacitance value of said measuring condensers being dependent upon the amount of fluid in the respective containers and the dielectric constant thereof; and circuit means connecting said first and second measuring condensers between said first and second connection points respectively and said second measuring point, said first measuring condenser being arranged such that its capacitance changes by an increment of "A" for each unit of fluid change in its respective container, said second measuring condenser being arranged such that its capacitance changes by an increment of "B" for each unit of fluid change in its respective container, said connection points being arranged in a manner such that the ratio of the magnitudes of the voltages from said first and second measuring points is B/A.

5. A system for totaling the amount of dielectric liquid in a plurality of containers of different configurations, comprising first and second sources of alternating voltage of the same frequency and of opposite phase, first and second measuring points, means connecting said first measuring point to both of said sources, resistance means connected across said first voltage source, said resistance means having a plurality of taps therealong, a plurality of capacitor type measuring condensers having spaced electrodes and being arranged to be positioned in said containers respectively, so that fluid enters the spaces between said electrodes respectively to an extent depending upon the amount of fluid in the respective containers, each of said measuring condensers having a constant value of incremental capacitance change per unit change in the quantity of fluid in the container in which it is positioned, circuit means connecting each of said measuring condensers between one of said taps and said second measuring point in a manner to energize said measuring condensers with a relative magnitude of energization inversely proportional to their relative values of incremental capacitance change to produce a signal of a first phase thereat, a second network branch extending between said second source and said second measuring point in a manner to produce a signal of a second phase thereat, said second network branch including an empty tank balancing condenser, the capacitance value of which is equal to the sum of the effective capacitance values of said measuring condensers when no liquid is between their plates, a third network branch also extending between said second voltage source and said second measuring point in a manner to produce a signal of said second phase thereat, said third network branch including a reference condenser and a dielectric constant compensation condenser having spaced electrodes and arranged to be positioned so that the fluid exists between its spaced electrodes at all times, signal responsive means, means connecting said signal responsive means to said first and second measuring points to apply to said signal responsive means a signal which is the resultant of said signals of first and second phases, and means actuated by said signal responsive means to vary the signal of one of said phases in a direction tending to reduce the resultant signal toward zero.

6. Measuring apparatus for measuring the total quantity of a dielectric fluid in a plurality of individual containers, comprising as sources of alternating voltage, a transformer having a secondary, first and second measuring points, means maintaining said first measuring point at a potential equal to the potential at a mid-point along said secondary, a first network branch extending between one end portion of said secondary and said second measuring point and including a reference condenser and a dielectric constant compensation condenser having spaced electrodes and arranged to be positioned so that the fluid exists between its electrodes at all times, said first network branch feeding to said second measuring point a signal of a first phase; a second network branch extending between the other end of said secondary and said second measuring point and including resistance voltage-dividing means connected to said other end of said secondary and across at least a part of said secondary, a plurality of taps on said voltage dividing means, a plurality of measuring condensers, each having spaced electrodes and being arranged to be positioned in said containers respectively, so that fluid enters the spaces between said electrodes to extents depending upon the amount of fluid in the respective containers, said measuring condensers being constructed and arranged so that the change in capacitance of each of said measuring condensers per unit change in the quantity of fluid in the containers in which they are respectively located is a constant value for each measuring condenser respectively, said measuring condensers being connected to respective taps of said voltage-dividing means in a manner such that the voltages at respective taps are inversely proportional to the constant values of the capacitance change per unit change in the quantity of fluid of said measuring condensers respectively, said second network branch feeding to said second measuring point a signal of a second phase, and signal responsive means coupled between said measuring points and arranged to vary the signal of one of said phases in a direction tending to reduce the resultant signal between said measuring points toward zero.

7. Apparatus for measuring the total quantity of a dielectric fluid in a plurality of individual containers, comprising as sources of alternating voltage, a transformer having a secondary, first and second measuring points, means maintaining said first measuring point at a potential equal to the potential at a mid-point along said secondary, a first potentiometer connected at least partially across one side of said secondary, a movable contact on said potentiometer, a reference condenser, a dielectric constant compensation condenser having spaced electrodes and arranged to be positioned so that the fluid exists between its spaced electrodes at all times, means connecting said condensers between said movable contact and said second measuring point in a manner to produce a signal of a first phase at said second measuring point, voltage-divider resistance means having spaced taps and being connected at least partially across the other side of said secondary, a plurality of measuring condensers arranged to be positioned in said containers respectively, so that the changes in capacitance of each of said measuring condensers per unit change in the quantity of fluid in said containers respectively are constants, means connecting said measuring condensers to respective taps on said voltage-dividing means in a manner such that the voltages at the respective taps are inversely proportional to said constants for the measuring condensers connected to said taps respectively, means connecting said measuring condensers to said second measuring point in a manner to produce a signal of a second phase at said second measuring point, signal responsive means connected to said measuring points and being arranged to move said movable contact along said potentiometer in such direction as to tend to equalize said signals of said first and second phases.

8. Apparatus as claimed in claim 7, further comprising second voltage-divider resistance means connected substantially in parallel with the first named voltage-divider resistance means and also having spaced taps, a second plurality of measuring condensers each arranged in the the same way as a respective one of the first named plurality of measuring condensers, and means connecting said measuring condensers of said second plurality to respective taps on said second voltage-dividing means in a manner corresponding to the connection of respective measuring condensers of said first named plurality of measuring condensers.

9. Apparatus as claimed in claim 7, further comprising second and third potentiometers connected across portions of said secondary on opposite sides of said midpoint, said second and third potentiometers having second and third movable contacts, respectively, said first potentiometer being connected between said second and third movable contacts.

10. Apparatus as claimed in claim 7, further comprising second and third potentiometers connected across portions of said secondary on opposite sides of said midpoint, said second and third potentiometers having second and third movable contacts, respectively, said first potentiometer being connected between said second and third movable contacts, and a fourth potentiometer connected across a portion of said other side of said secondary adjacent to said third potentiometer, said fourth potentiometer having a fourth movable contact connected to one end of said voltage-dividing means.

11. Apparatus for measuring the total quantity of dielectric fluid in a plurality of individual unlike containers, comprising a measuring condenser individual to each of said containers and having an individual capacitance value varying with the amount and dielectric constant of the fluid in the associated container, each of said measuring condensers having a constant value of incremental capacitance change per unit change in the quantity of fluid in the container with which it is associated, a reference condenser, a combined reference and dielectric-constant-compensation condenser having spaced electrodes with the space therebetween filled with a representative sample of the measured fluid so as to have a value of capacitance varying with the dielectric constant thereof, a source of alternating voltage of a first phase so individually energizing said measuring condensers as to develop measuring currents having for any pair of measuring condensers associated with a pair of containers filled to the same percentage of fullness a predetermined ratio of measuring current values, a source of alternating voltage of the same frequency but of opposite phase to said first voltage for energizing said reference condenser and said reference-compensation condenser to produce a reference current of a second phase, means responsive to the resultant of the currents of all of said condensers for varying the magnitude of the currents of one of said phases in a direction and to an extent tending to reduce the resultant of the measuring and reference currents substantially to zero, and indicator means actuated by said last-named means to indicate the total quantity of fluid in said containers.

12. Apparatus for measuring the total quantity of dielectric fluid in a plurality of individual containers having at least two unequal values of relative horizontal cross-sectional areas, comprising a measuring condenser individual to each of said containers, each of said measuring condensers having a relative empty-container capacitance value inversely proportional to the relative horizontal cross-sectional area of the container with which it is used and an individual capacitance value varying with the amount and dielectric constant of the fluid in the associated container but having constant incremental capacitance change per unit change in the quantity of fluid in the container with which it is associated, a reference condenser, a combined reference and dielectric-constant-compensation condenser having spaced electrodes with the space therebetween filled with a representative sample of the measured fluid so as to have a value of capacitance varying with the dielectric constant thereof, means for so individually energizing said measuring condensers with an alternating voltage of a first phase as to develop measuring currents having for any pair of measuring condensers associated with a pair of containers filled to the same percentage of fullness a predetermined ratio of measuring current values, means for energizing said reference condenser and said reference-compensation condenser with an alternating voltage of the same frequency but of opposite phase to said first voltage to produce a reference current of a second phase, means responsive to the resultant of the currents of all of said condensers for varying the magnitude of the currents of one of said phases in a direction and to an extent tending to reduce the resultant of said measuring and reference currents substantially to zero, and indicator means actuated by said last-named means to indicate the total quantity of fluid in said containers.

13. Apparatus for measuring the total quantity of a dielectric fluid in a plurality of unlike containers, comprising a measuring condenser positioned in each said container and having spaced electrodes between which said liquid enters to an extent varying with the quantity thereof in the associated container, a combined reference and dielectric constant compensation condenser having spaced electrodes with the space therebetween filled with a sample of the measured fluid, a fixed reference condenser having a value of capacitance relatively constant and independent of the dielectric constant of said fluid, an impedance providing two impedance sections with a conjugate-point tap therebetween, an impedance bridge having said measuring condensers and one of said impedance sections included in at least one branch thereof and having the other of said impedance sections and said reference and fixed condensers in another branch thereof, first diametric conjugate bridge points being adapted to be energized from a source of alternating potential, energization of each measuring branch being selected to provide equality in the proportional changes of the currents through said measuring condensers for the same percentage change in the quantity of fluid in each container with respect to the full storage capacity thereof, adjustable means in said other bridge branch for balancing said bridge with respect to the currents flowing through said measuring condensers, means responsive to the magnitude of any unbalance component of bridge energization appearing between a second pair of diametric conjugate output points of said bridge for controlling said adjustable means to adjust to substantial bridge balance values the magnitudes of the currents flowing through said bridge branches, and indicator means controlled by said last-mentioned means for indicating said total quantity of liquid.

References Cited in the file of this patent

UNITED STATES PATENTS

| | | |
|---|---|---|
| 2,188,628 | Freystedt | Jan. 30, 1940 |
| 2,563,280 | Schafer | Aug. 7, 1951 |
| 2,581,085 | Edelman | Jan. 1, 1952 |